(No Model.)
J. HENRICH & G. SCHAEFER.
ASH SIFTER AND RECEPTACLE.
No. 256,840. Patented Apr. 25, 1882.
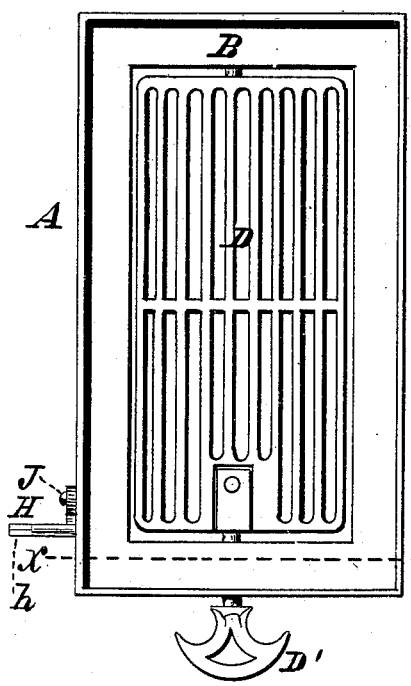
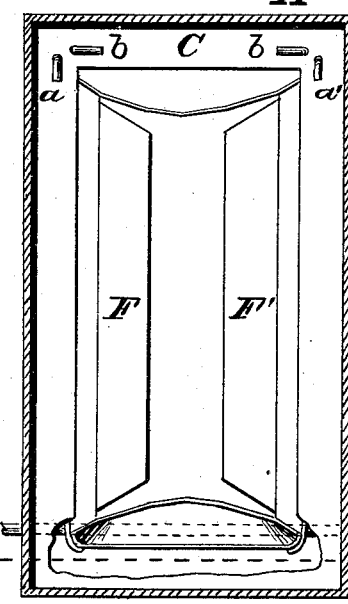
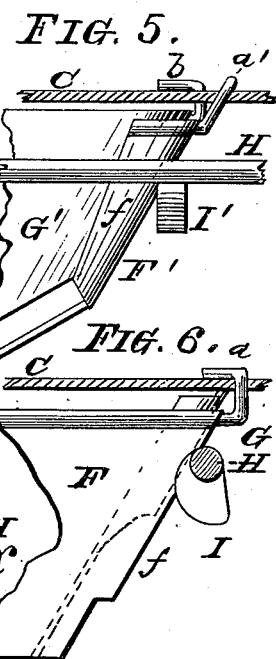
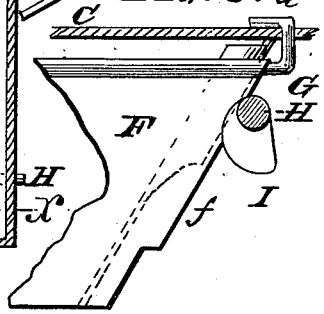
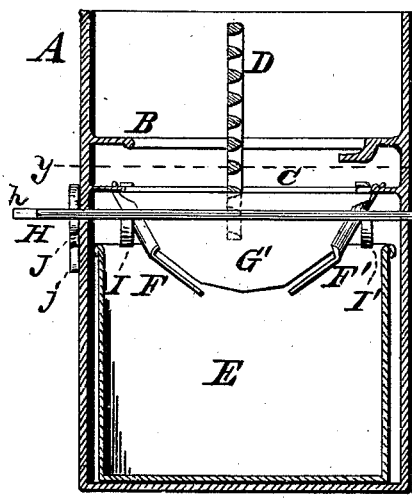
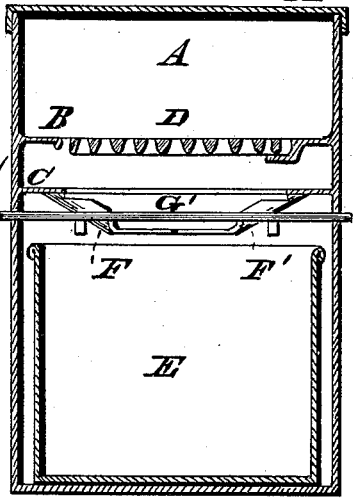
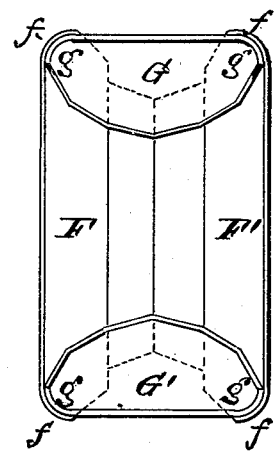
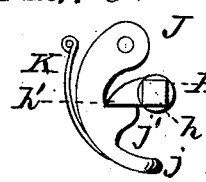
Witnesses:
Willie O. Stark.
A. Stark.
Inventors:
John Henrich,
George Schaefer,
by Michael J. Stark
Attorney

United States Patent Office.

JOHN HENRICH AND GEORGE SCHAEFER, OF BUFFALO, NEW YORK.

ASH SIFTER AND RECEPTACLE.

SPECIFICATION forming part of Letters Patent No. 256,840, dated April 25, 1882.

Application filed March 16, 1882. (No model.)

*To all whom it may concern:*

Be it known that we, JOHN HENRICH and GEORGE SCHAEFER, of Buffalo, in the county of Erie, New York, have jointly invented certain new and useful Improvements on an Ash Sifter and Receptacle; and we do hereby declare that the following description of our said invention, taken in connection with the accompanying sheet of drawings, forms a full, clear, and exact specification, which will enable others skilled in the art to which it appertains to make and use the same.

Our present invention has general reference to ash receptacles and sifters; and it consists essentially in the novel combination of parts and details of construction, as hereinafter first fully set forth and described, and then pointed out in the claims.

The object of our said invention is the production of a neat, simple, and convenient device for separating the ashes and clinkers from unburned coal, said device being particularly constructed with a view toward its adaptation to ranges, stoves, and similar apparatus.

In the drawings already mentioned, which serve to illustrate our said invention more fully, Figure 1 is a plan of our improved ash receptacle and sifter. Fig. 2 is a transverse sectional elevation in line $x$ of Fig. 1. Fig. 3 is a sectional plan of the apparatus below the line $y\,y$ of Fig. 2. Fig. 4 is a sectional elevation, illustrating the wings of the spout in a closed or folded position. Figs. 5 and 6 are elevations of portions of the wings, and Fig. 7 is a plan of the same.

Like parts are designated by corresponding letters of reference in all the figures.

A in these figures designates either a box-shaped receptacle or a portion of a stove or range, as the case may be, our said invention being adapted for use either in a stove, &c., or as a separate ash-sifter without change or modification. If constructed for use as a separate ash-sifter, we provide this receptacle with a cover, A', as indicated in Fig. 4. Within the receptacle A are two horizontal open partitions or flanges, B C, respectively, the former being provided with a vibratory and revolving grating, D, of the usual and well-known construction, while below the latter there is a drawer, E, for the reception of the ashes, clinkers, &c.

To the diaphragm C are hinged four wings, F F' G G', respectively, by means of hook-shaped pivots $a\,b$, Figs. 3, 5, and 6, two of which, F F', are provided with curved ends $f\,f$, while the others, G G', have similar curved ends, $g\,g$, the said ends being so matched that when the longitudinal wings F F' are being folded by means of cams I, secured to or forming one piece with a rock-shaft, H, they will cause the end wings, G G', to also fold up, and thereby to assume the position illustrated in Figs. 4 and 7.

On the outer extremity of the rock-shaft H we provide a projection, $h'$, Fig. 8, engaging a similar projection, $j'$, on a catch, J, in such manner that when the wings F F' G G' are folded, and thereby form a platform or flooring for the reception of ashes, &c., they (the wings) are held in that position by said projections $h'$ $j'$, either with or without the intervention of a spring, K, while if the catch $j'$ is caused to release the projection $h'$ the wings F F' G G' will drop of their own accord, and thereby dump the ashes, &c., into the drawer E.

It will now be observed that when the wings F F' G G' are dropped they constitute a spout or chute, the lower edges of which are below the upper edge of the drawer E, thereby preventing the ashes, &c., from being deposited between the drawer and walls of the receptacle A—a drawback inherent to all the different ash sifters and receptacles now in use in stoves, ranges, &c.

In operation the wings are upheld in a folded position by the catches $h'\,j'$. The ashes on the grating D are sifted through the grating by vibrating the latter by the handle D', Fig. 1, and caused to deposit upon the folded wings mentioned. When a sufficient amount has accumulated said ashes, &c., are dropped into the drawer E by pushing the catch J on the part $j$ to cause the projection $j'$ to withdraw from the projection $h'$ and the wings F F' G G' to unfold.

As an attachment to ranges and stoves having the vibratory ash-sifter D the auxiliary bottom formed by the wings F F' G G' is a very desirable adjunct and may be supplied at a trifling expense.

Having thus fully described our invention, we claim as new and desire to secure to us by Letters Patent of the United States—

1. In stoves, ranges, &c., having an ash-sifting device, an auxiliary bottom for the ash-receptacle, substantially as and for the object specified.

2. In stoves, ranges, &c., having an ash-sifting device, a drop-bottom for the ash-receptacle, substantially as stated.

3. A drop-bottom for an ash-receptacle, consisting of folding wings actuated by mechananism substantially as mentioned.

4. An ash-sifter having a suitable grating for separating the coarser from the finer particles, a drop-bottom below said grating actuated by mechanism substantially as described, and a receptacle for said separated particles below said drop-bottom, the whole being constructed for operation, substantially as and for the object specified.

5. In ash-sifters, a drop-bottom constructed of wings forming a spout when in an unfolded position, as stated.

6. The combination, with the receptacle A, having the vibratory and oscillating grating D, of a drop-bottom for retaining the separated particles, said bottom being composed of four wings, F F' G G', respectively, having curved ends matched together, as stated, and a device, substantially as specified, for folding the wings in a manner as and for the purpose stated.

7. In ash-sifters, the folding wings F F' G G', having curved ends $f$ $g$, as stated, in combination with the rock-shaft H, having cams I, and a device, substantially as specified, for upholding said wings in a folded position, as mentioned.

8. As an improved article of manufacture, an ash-sifter consisting essentially of a box-shaped receptacle, A, having inwardly-projecting flanges B C, a vibratory or other proper separator, D, an auxiliary bottom below said separator, consisting of folding wings, actuated and retained in position by devices substantially as specified, and a receptacle below said auxiliary drop-bottom for the reception of the separated particles, the whole being constructed and arranged for operation and use, as and for the purpose specified.

In testimony that we claim the foregoing as our invention we have hereto set our hands in the presence of two subscribing witnesses.

JOHN HENRICH.
GEORGE SCHAEFER.

Attest:
MICHAEL J. STARK,
WM. HEISER.